United States Patent [19]

Brannan, Jr.

[11] Patent Number: 4,578,721

[45] Date of Patent: Mar. 25, 1986

[54] STRESS TEST FOR MAGNETIC DISC RECORDING APPARATUS

[75] Inventor: William L. Brannan, Jr., Felton, Calif.

[73] Assignee: Seagate Technology, Scotts Valley, Calif.

[21] Appl. No.: 648,470

[22] Filed: Sep. 10, 1984

[51] Int. Cl.$^4$ ............................................... G11B 5/09
[52] U.S. Cl. ........................................ 360/51; 360/46; 360/53
[58] Field of Search ........................ 360/51, 53, 43, 46

[56] References Cited

U.S. PATENT DOCUMENTS

| | | | |
|---|---|---|---|
| 4,394,695 | 7/1983 | Mahow | 360/51 |
| 4,459,623 | 7/1984 | Glenn, II et al. | 360/51 |
| 4,532,559 | 7/1985 | Long et al. | 360/51 |

*Primary Examiner*—Vincent P. Canney
*Attorney, Agent, or Firm*—Flehr, Hohbach, Test, Albritton & Herbert

[57] ABSTRACT

Method and apparatus for testing tracking accuracy in a disc drive are disclosed. Each head and each track is treated as a unique entity. Each track has an inherent window margin. Stored data is read by a head skewed (or delayed) in the window toward one edge of the window until errors are encountered. The data is then advanced toward the center 5% of the bit cell past the point at which errors are not encountered. With the data positioned in the window 5% from it's failure point, any noise or media defects will cause the data bits to fall out of the window and thus cause an error. Any soft errors that repeat in the same byte area are logged as hard errors. This testing method accomplishes both a defect mapping test and soft error rate test in one test in the least amount of time from the interface.

5 Claims, 2 Drawing Figures

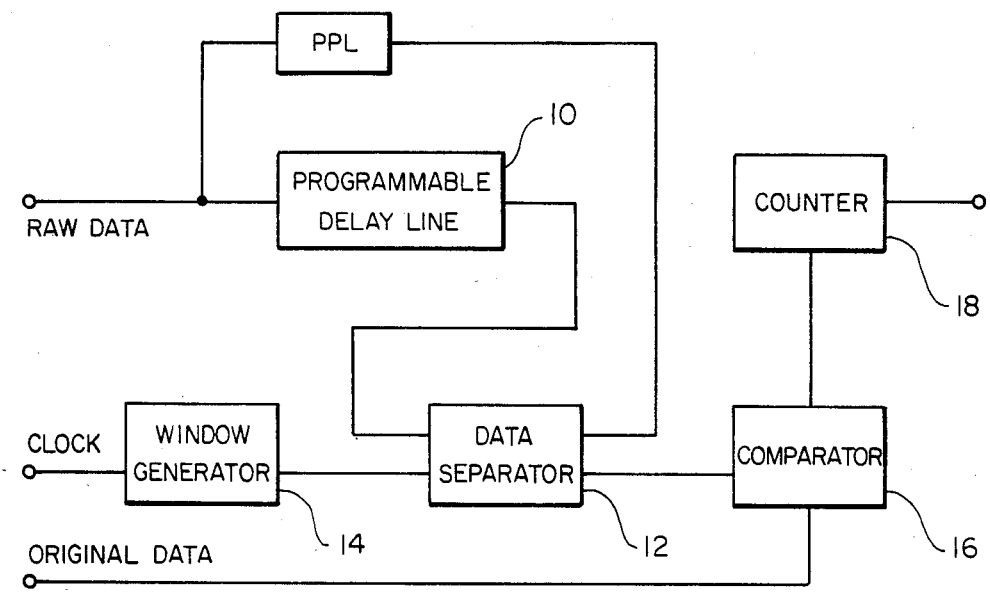
FIG_1
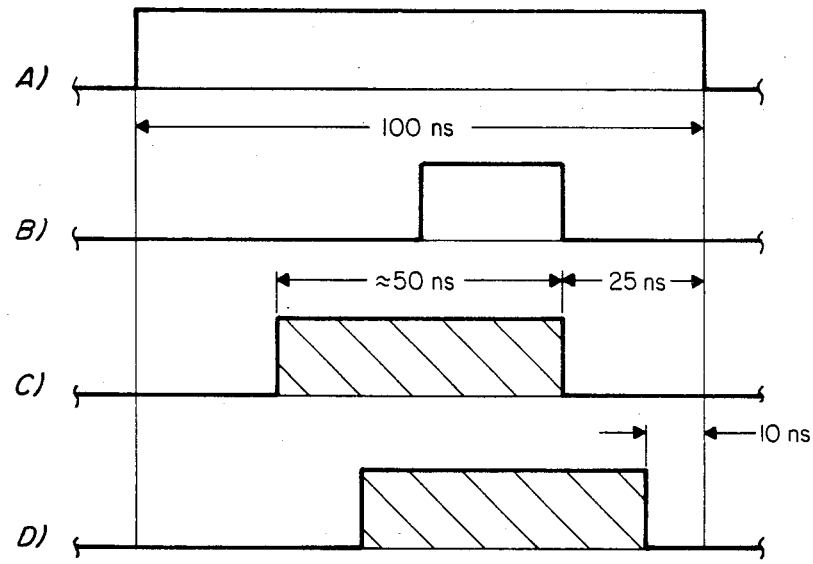
FIG_2

STRESS TEST FOR MAGNETIC DISC RECORDING APPARATUS

This invention relates generally to method and apparatus for evaluating a magnetic recording system.

The bit error rate in digital magnetic recording systems is a measure of their performance. It may be defined as the fraction of detected bits in a bit stream that differ from those actually recorded on the recording media and read therefrom. The bit error rate arises from defects in the system such as adjacent track pick-up, poor tracking, etc.

It is an object of the present invention to provide an improved method and apparatus for evaluating a recording system.

The conversion of MFM data to NRZ data requires phase locking and data separation. The clock bits of the MFM data are used to generate a timing window signal to detect if a data "one" is present at the alloted time. The window signal is one half the length of the MFM cell time. A binary "one" will be decoded correctly as long as it occurs within the window. If no bit occurs in the window a binary zero will be decoded. At any time the "ones" bit falls outside the time frame of the window, or if the clock transition falls into the window, an error occurs.

Under ideal conditions, the data "1" will occur in the center of the window. Inherent factors in disc drives such as bit jitter, speed variation, media defects and noise, force the data bit to occur throughout the window. The overall bit distribution in the window is measured by the window margin test. This test is the average amount of the window that is occupied by a number of data bits. As long as the data bits occur inside the window, no error will occur. However, this window margin test does not have the ability to test the drive's noise rejection capacity, and many media defects are not of sufficient magnitude to force the data bit outside the window to cause an error every time the same data is reread. It is therefore an objective of this invention to provide a more accurate test of a disc drive's ability to record and reproduce data.

In the testing of Winchester disc drives, it is desirable to accurately locate any media defects, measure the noise rejection capability and insure the soft error rate from the interface. To verify a soft error rate of $10^{-10}$ power, one would have to transfer $5 \times 10^{-10}$ bits of data. (NOTE: statistical math requires 1/Pe bits to verify Pe.) This process takes a minimum of 20 hours. The chances of encountering a media defect in a single read operation are approximately 60%. In a standard window margin test which reads the data once per timing strobe setting, many defects are therefore undetected.

To test the drives noise rejection ability, one known approach is to inject noise into the drive and monitor for bits that fall outside the window. An alternative is to narrow the window size while reading data to insure that errors are not encountered when the drive is placed in an operating environment, using full length data windows.

Data separation with the MFM data intentionally positioned off the center of the window enables the user to detect a marginal condition in the drive.

Previous attempts at testing the above parameters have delayed the data in the window by a fixed amount. Utilizing this method does not guarantee adequate testing of the entire drive. If the data is delayed too much in the window, too many soft errors occur and the information is meaningless. If the data is not delayed enough, the media defects will not be mapped adequately and the noise rejection ability not measured.

It is important to note the margin value in determining how much to offset the data from the center. Each head/disc combination has a inherent window margin value. It is not unusual to have a very high margin value head and a low margin value head in the same drive. The window margins are inherently higher toward the outside of the disc than the inside of the disc. To apply a fixed offset overstresses the weakest head. The signal to noise ratio is much better toward the outside of the disc. Fixed offset fails to stress the outside tracks adequately; therefore, many media defects can go undetected.

A prior art patent U.S. Pat. No. 4,394,695, describes a method of simultaneously applying the data read to a plurability of different windows, the data being delayed by a different, fixed amount for each window. However such a method requires a special, complex testing apparatus, and is not as accurate as the method disclosed here. Further using absolute values (i.e. 10ns) of margining with varying signal to noise ratios does not make theoretical sense.

It is an objective of the present invention to provide an accurate testing system which does not require any special testing apparatus.

These and other objectives of the present invention are achieved by the claimed method and apparatus in which each head and each track is treated as a unique entity. Each track has an inherent window margin. The data is skewed (or delayed) in the window toward one edge of the window until errors are encountered. The data is then advanced toward the center 5% of the bit cell past the point at which errors are not encountered. With the data positioned in the window 5% from its failure point, any noise or media defects will cause the data bits to fall out of the window and thus cause an error. Any soft errors that repeat in the same byte area are logged as hard errors. This testing method accomplishes both a defect mapping test and soft error rate test in one test in the least amount of time from the interface. If an end user's quassian noise of the system results in <23db additional SNR degradation, this 5% Stress Test is enough to insure adequate performance in an operating environment.

The invention will be more clearly understood from the following description taken in connection with the accompanying drawings in which:

FIG. 1 is a block diagram of a bit error rate testing system in accordance with an embodiment of the invention; and, FIG. 2 includes A-D which show signal waveforms useful in understanding the operation of the present invention.

As described above, in the present invention the recording system is evaluated by directly measuring the error rate as a function of the percentage of the original data which is lost in readout. To make this measurement, the window in which data is read is moved close to the point at which it is known that a certain minimum level of data loss occurs, i.e. about 10 bits in 10,000.

The invention can best be understood by first referring to FIG. 2 in which line A represents a data window as it is used in an actual operating disc drive used in a normal commercial setting.

Typically, the window is about 100 nanoseconds in length. An actual data bit which is to be read during the window, when properly recorded and read, occupies a length of about 25 nanoseconds; when positioned ideally within the window, its leading edge is at 50 nanoseconds. The leading edge is so positioned in the center of the window, because as explained above, a "1" can be detected only if the leading edge is detected during the positive going portion of the window.

Contrary to the ideal situation shown in line B however, it has been found by test of actual operating devices that the typical normal distribution, when measured in a window, will occur over a range of approximately 50 nanoseconds, with the leading edge of the data byte occuring anywhere within the shaded area shown on line C. Therefore, in a typical test system, a defect of greater than 25 nanoseconds in magnitude would be required for an error to be detected.

Therefore, to test the likelihood of a non-read error, the data is moved closer to the trailing edge of the window. This is done by modifying the delay incorporated in a programmable delay line which is incorporated in the test circuit shown in FIG. 1.

Specifically, the test circuit includes a programmable delay line 10, whose output, i.e. the data read from the disc track, is applied to a data separator 12 along with the output of a window generator 14. By the use of a phase lock loop, whose use is well known in this art, the detection of bytes is syncronized with the clock output of the window generator. This sychronization is related to the frequency of occurance of raw data and the occurance of the window generator. By modifying the delay occuring in the program delay line, the data bits being detected as occuring during a window can be moved closer to the trailing edge of the window opening. Those data bits which are detected by the data separator 12 as having their leading edge occuring within the proper margin in the window are compared in the comparator with the original data which is applied to the comparator 16. A count is kept in counter 18 of the number of errors which occur in reading the data from any track. When a sufficient number of errors are counted to indicate that the delay has been increased to a level which is significant, then the delay is reduced so that the window margin is approximate 5% back toward the center of the window from the point at which this noticeable level of error detection occurs. Once the data window has been marginalized, as shown in line D of FIG. 2, then a count can be taken of the number of bits which are properly read on a given track of the disc drive. Once this count has been taken at this statistically significant ideal window margin for determining soft error occurance, (a process which takes only a matter of seconds); the controller performs several read operations and records the byte location of any and all errors that occur at this point. The head may be moved to the next track to perform the same test on that track. Thus the collaboration between each head and each track on the disc in accurately reading and writing data can be accurately and individually tested using the system of the present invention.

Modifications of the present invention may occur to a person of skill in the art who has studied the present invention disclosure. Therefore, the scope of the present invention should be limited only by the following claims.

What is claimed is:

1. Apparatus for evaluating recording systems including means coupled to said head for reading data from one of said tracks, means for generating a succession of data windows having leading and trailing edges, a data separator connected to receive said data windows and the read data and serving to separate out data which falls outside the windows, and means for delaying said data from each track on the disc relative to at least one edge of said data windows to provide a more limited effective size window at said separator for testing the effective separation of the data, said delaying means including means for delaying the data until errors are encountered to define a failure point, and for reducing the data delay to a time just less than the failure point.

2. Apparatus as in claim 1 including means for providing different relative positions between at least one edge of said window and said data, said delay reducing means comprising means for delaying the data to a point within 5% of the failure point.

3. The method of evaluating a recording system which includes passing the data reproduced from each track of a disc drive in said system comprising reading data recorded on each track of said drive, delaying the data read from each track a variable amount, generating a succession of data windows, comparing the read data which occurs within the windows with the raw data recorded on the tracks, comparing the read data with the raw data until a significant error level occurs, reducing the delay on said read data, and rereading said recorded data to generate an error rate.

4. The method of claim 3 wherein said data is delayed at said rereading step to within about 5% of the failure point.

5. The method of claim 3 wherein the step of reducing the delay on said read data includes delaying the data until errors are encountered to define a failure point, and reducing the data delay to a time just less than the failure point.

* * * * *